United States Patent
Jia et al.

(10) Patent No.: US 9,982,117 B2
(45) Date of Patent: May 29, 2018

(54) THERMOSET RUBBER REINFORCED BY SUPRAMOLECULE BUILDING BLOCKS

(71) Applicants: Li Jia, Hudson, OH (US); Gary Hamed, Cuyahoga Falls, OH (US); Xin Tan, Akron, OH (US)

(72) Inventors: Li Jia, Hudson, OH (US); Gary Hamed, Cuyahoga Falls, OH (US); Xin Tan, Akron, OH (US)

(73) Assignee: The University of Akron, Akron, OH (US)

( * ) Notice: Subject to any disclaimer, the term of this patent is extended or adjusted under 35 U.S.C. 154(b) by 37 days.

(21) Appl. No.: 15/024,557

(22) PCT Filed: Sep. 26, 2014

(86) PCT No.: PCT/US2014/057631
§ 371 (c)(1),
(2) Date: Mar. 24, 2016

(87) PCT Pub. No.: WO2015/048398
PCT Pub. Date: Apr. 2, 2015

(65) Prior Publication Data
US 2016/0237261 A1    Aug. 18, 2016

Related U.S. Application Data

(60) Provisional application No. 61/882,687, filed on Sep. 26, 2013.

(51) Int. Cl.
*C08L 19/00* (2006.01)
*C08L 77/10* (2006.01)

(52) U.S. Cl.
CPC .............. *C08L 19/006* (2013.01); *C08L 77/10* (2013.01)

(58) Field of Classification Search
CPC ................................ C08L 19/006; C08L 77/10
See application file for complete search history.

(56) References Cited

U.S. PATENT DOCUMENTS

| | | | |
|---|---|---|---|
| 5,686,507 A | | 11/1997 | Hermele |
| 5,777,033 A | * | 7/1998 | Venkataswamy ......... C08F 8/30 |
| | | | 525/182 |
| 2008/0287582 A1 | | 11/2008 | Weiss |
| 2012/0329916 A1 | * | 12/2012 | Hergenrother ........... C08K 3/04 |
| | | | 524/21 |

OTHER PUBLICATIONS

Rad, Z.P., et al.; Journal of Aerosol Science, 2012, vol. 51, p. 49-56.*
Denchev et al. Chapter 8: Manufacturing and Properties of Aramid Reinforced Composites. Bhattacharyya, Debes, and Stoyko Fakirov, eds. Synthetic polymer-polymer composites. Carl Hanser Verlag GmbH Co KG, 2012. [retrieved on Feb. 2, 2015]. Retrieved from the Internet. <URL: http:l/www.researchgate.net/profile/Ziatan_Denchev/publication/234023766_Manufacturing_and_Properties_of_Aramld_Reinforced_Polymer_Composites/linkslOfcfd50ec536bd6af5000000.pdf> entire document.
Scavuzzo, J. J. Elastomers Physically Cross-Linked by Oligo(~Aianine). PhD diss., The University of Akron Dec. 2014. [retrieved on Feb. 2, 2015]. Retrieved from the Internet. <URL: https:l/etd.ohiolink.edu/!etd.send_file?accession=akron1412937878&disposition=inllne> See pp. i-xvii and 35-77.

* cited by examiner

*Primary Examiner* — Robert Jones, Jr.
(74) *Attorney, Agent, or Firm* — Renner Kenner Greive Bobak Taylor & Weber

(57) ABSTRACT

A thermoset rubber composition includes a thermoset rubber having crystallized domains dispersed therein, the crystallized domains being formed of supramolecule building blocks forming a plurality of sheet-like structures through hydrogen bonding, the sheet-like structures interacting through non-covalent interactions to form the crystallized domains within the thermoset rubber. The supramolecular building blocks may be peptides, β-peptides, aramid oligomers, and bis-ureas.

18 Claims, 10 Drawing Sheets

THERMOSET RUBBER REINFORCED BY SUPRAMOLECULE BUILDING BLOCKS

CROSS-REFERENCE TO RELATED APPLICATIONS

The present application claims priority to U.S. Provisional Patent Application Ser. No. 61/882,687, filed Sep. 26, 2013, the entirety of which is incorporated herein by reference.

FIELD OF THE INVENTION

The present invention generally relates to the use of supramolecular fillers for reinforcing rubber compositions. In some embodiments, the present invention relates to a thermoset rubber composition. The thermoset rubber composition includes a thermoset rubber, wherein the thermoset rubber includes dispersed crystalline domains (nanoassemblies) formed by supramolecule building blocks being covalently linked therein. The supramolecule building blocks form sheet-like structure via hydrogen bonding, and the sheets stack through non-covalent interactions, such as van der Waals forces and dipole-dipole interactions, to crystalline domains.

BACKGROUND OF THE INVENTION

In conventional rubber reinforcement, rubber reinforcement is carried out by addition of carbon black or silica. Reinforced rubber may be employed in such applications as automobile tires, hoses, conveyor belts, or products of the like.

In the past, polymers such as polyamides or polyurethanes were utilized in tire applications for reinforcement. However, when such polymers are used, hydrogen-bonding units are left in the amorphous form or not microphase-separated from rubber providing unacceptable hysteresis.

Telechelic polyisobuylenes and polybutadienes having oligo-β-alanine end groups have been provided as new thermoplastic elastomers. See Jia, et al., PCT Patent Application No. PCT/US13/37974, incorporated herein by reference in its entirety. It was determined that the oligo(β-alanine) domains microphase-separated to provide crystalline β-sheet domains in the thermoplastic elastomers.

The present invention employs a similar supramolecule approach in reinforcing thermoset rubber. The present invention provides a composition for reinforcing thermoset rubber utilizing crystalline domains provided by supramolecule building blocks further defined herein. The present invention provides thermoset rubber that controls energy dissipation in such a way that low rolling resistance, high wet skid resistance, high abrasion resistance and high crack resistance are simultaneously achieved.

SUMMARY OF THE INVENTION

In a first embodiment, the present invention provides a thermoset rubber composition. The thermoset rubber composition comprises a thermoset rubber having crystallized domains dispersed therein. The crystallized domains are formed of supramolecule building blocks which form a plurality of sheet-like structures through hydrogen bonding. The sheet-like structures interact through non-covalent interactions to form the crystallized domains within the thermoset rubber.

In a second embodiment, the present invention provides a thermoset rubber composition as in the first embodiment, wherein the supramolecule building blocks are selected from peptides, β-peptides, aramid oligomers, and bis-ureas.

In a third embodiment, the present invention provides a thermoset rubber composition as in the first or second embodiment, wherein the supramolecule building blocks are covalently linked to the thermoset rubber.

In a fourth embodiment, the present invention provides a thermoset rubber composition as in the first through third embodiments, wherein the supramolecule building blocks are β-alanines according to the following structure:

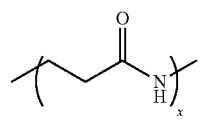

wherein x is from 1 to 8.

In a fifth embodiment, the present invention provides a thermoset rubber composition as in any of the first through fourth embodiments, wherein the supramolecule building blocks are aramids according to one of the following structures:

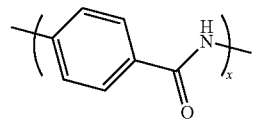

wherein x is from 1 to 8.

In a sixth embodiment, the present invention provides a thermoset rubber composition as in any of the first through fifth embodiments, wherein the supramolecule building blocks are aramids according to one of the following:

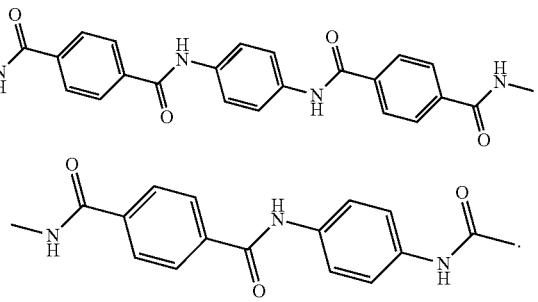

In a seventh embodiment, the present invention provides a thermoset rubber composition as in any of the first through sixth embodiments, wherein the supramolecule building blocks are aramids according to one of the following:

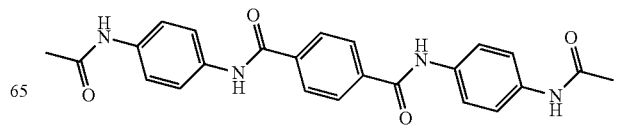

-continued

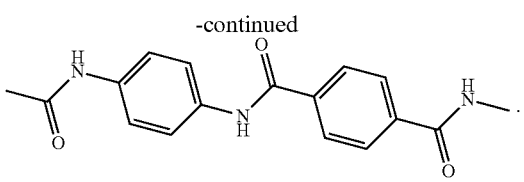

In an eighth embodiment, the present invention provides a thermoset rubber composition as in any of the first through seventh embodiments, wherein the supramolecule building blocks are aramids according to one of the following structure:

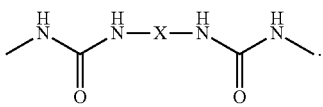

In a ninth embodiment, the present invention provides a thermoset rubber composition as in any of the first through eighth embodiments, wherein the thermoset rubber is selected from the group consisting of polybutadiene, styrene-butadiene (SBR), polyisoprene, derivatives thereof and mixtures thereof.

In a tenth embodiment, the present invention provides a process of forming a reinforced thermoset rubber as in any of the first through ninth embodiments. The process of forming a reinforced thermoset rubber comprises the steps of covalently linking supramolecule building blocks to a curable functional group to form a supramolecular filler, dispersing the supramolecular filler in a thermosetting rubber, wherein the thermosetting rubber includes unsaturated active sites capable of crosslinking to form a thermoset rubber. Thereafter, crosslinking the thermosetting rubber to form a thermoset rubber with the supramolecule building blocks forming a plurality of sheet-like structures through hydrogen bonding, wherein the sheet-like structures interact through non-covalent interactions to form crystallized domains within the thermoset rubber, and wherein the supramolecular filler covalently links the supramolecular building block to the thermosetting rubber during one step of dispersing or during one step of crosslinking.

In an eleventh embodiment, the present invention provides a thermoset rubber as in any of the first through tenth embodiments, wherein the supramolecule building blocks are selected from peptides, β-peptides, aramid oligomers, and bis-ureas.

In a twelfth embodiment, the present invention provides a process of forming a reinforced thermoset rubber as in any of the first through eleventh embodiments, wherein the supramolecular filler has the following structure:

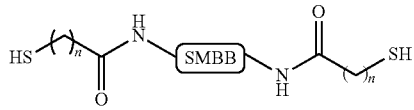

wherein SMBB represents a supramolecular building block selected from peptides, β-peptides, aramid oligomers, and bis-ureas, and n is 2 or greater.

In a thirteenth embodiment, the present invention provides a process of forming a reinforced thermoset rubber as in any of the first through twelfth embodiments, wherein the supramolecular filler has the following structure:

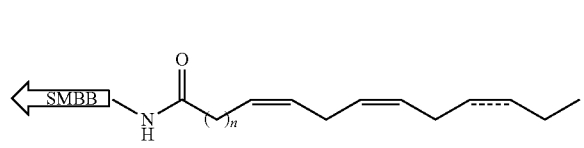

wherein SMBB represents a supramolecular building block selected from peptides, β-peptides, aramid oligomers, and bis-ureas, and n is 2 or greater.

In a fourteenth embodiment, the present invention provides a process of forming a reinforced thermoset rubber as in any of the first through thirteenth embodiments, wherein the supramolecular filler has the following structure:

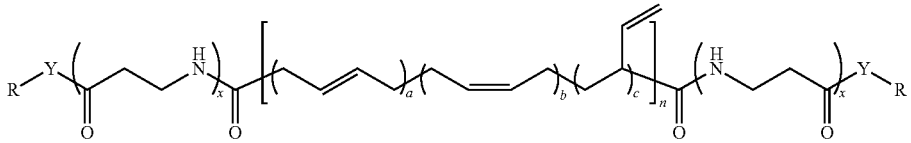

wherein a, b, and c are the fraction of each isomer of butadiene. Each of the isomers comprising from 0% to 100% of a polybutadiene segment such that the total percentage of the isomers is 100% of the polybutadiene segment, n is a number average degree of polymerization of 50,000 or less, x is an integer from 2 to about 10, Y is selected from C, O or NH and R is a hydrogen atom, an organic group, or inorganic group.

In a fifteenth embodiment, the present invention provides a process of forming a reinforced thermoset rubber as in any of the first through fourteenth embodiments. The process of forming a reinforced thermoset rubber comprises the steps of covalently linking supramolecule building blocks to a thermosetting rubber, wherein the thermosetting rubber includes unsaturated active sites capable of crosslinking to form a thermoset rubber. Thereafter, mixing the thermosetting rubber to disperse the supramolecular building blocks therein and thereafter crosslinking the thermosetting rubber to form a thermoset rubber with the supramolecule building blocks forming a plurality of sheet-like structures through hydrogen bonding. The sheet-like structures interact through non-covalent interactions to form crystallized domains within the thermoset rubber.

DETAILED DESCRIPTION OF ILLUSTRATIVE EMBODIMENTS

Figure 1:
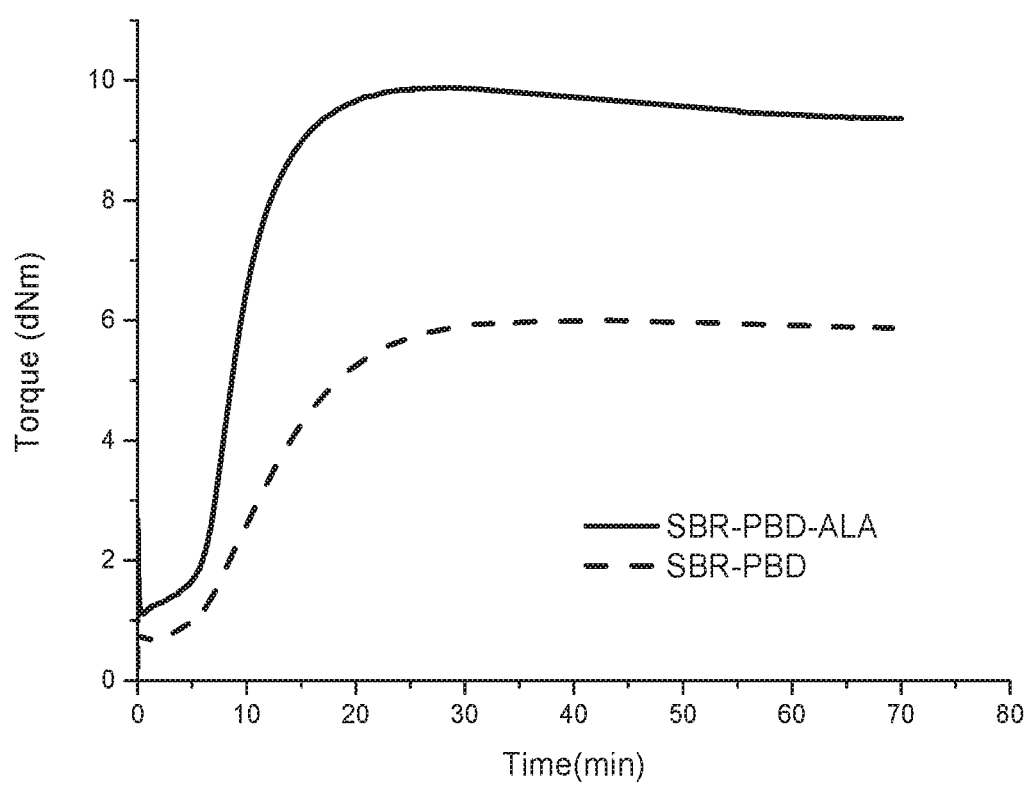
FIG. 1 is graph of the results illustrating the vulcanization kinetics of vulcanizing rubber samples, prepared according to various embodiments of the present invention.
Figure 2:
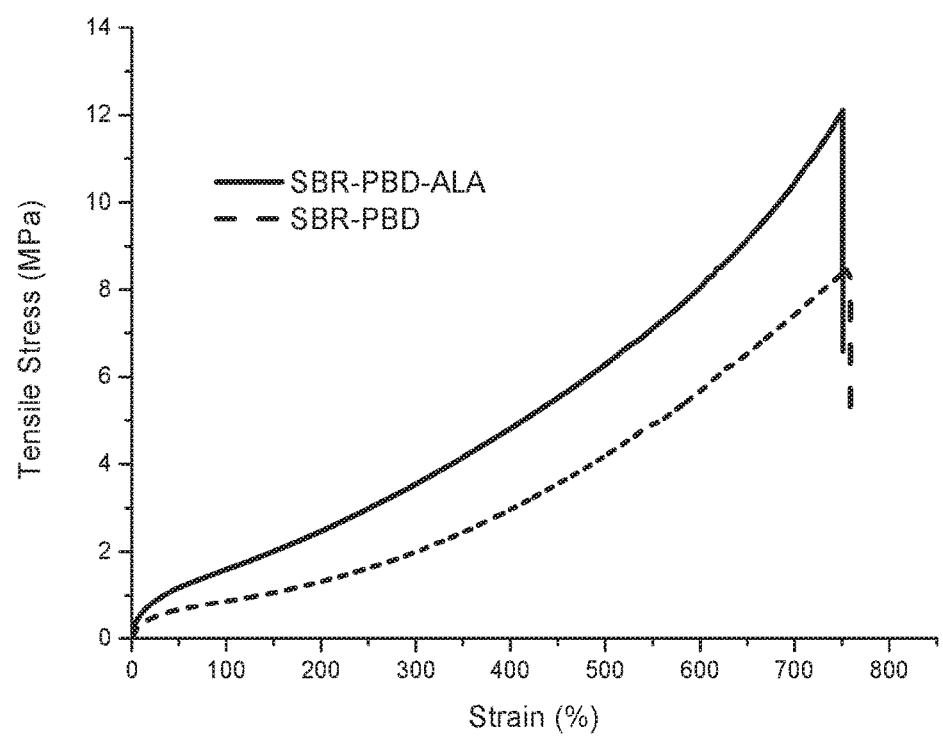
FIG. 2 is a graph of the results of a stress/strain analysis, prepared according to various embodiments of the present invention.
Figure 3:
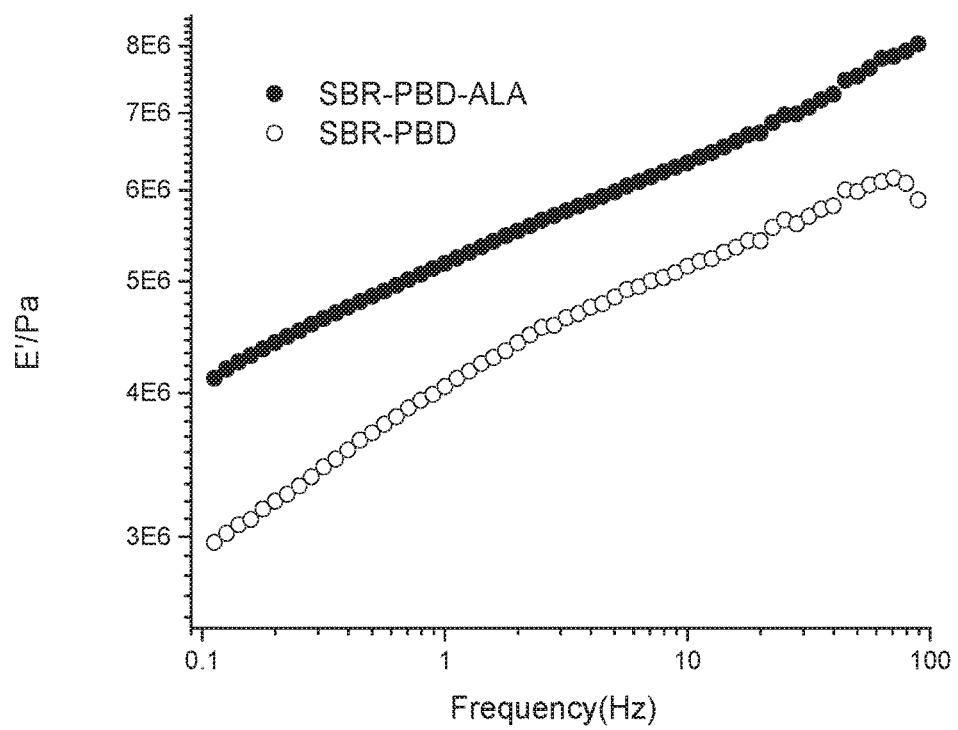
FIG. 3 is a graph showing the results of a dynamic mechanical analysis carried out at room temperature, and a strain amplitude of 10%, measuring frequency dependence of storage modulus E', prepared according to one embodiment of the present invention.

The present invention is generally directed to the use of supramolecule building blocks for reinforcing thermoset rubber compositions. The supramolecule building blocks are incorporated into thermosetting rubber formulations so as to be covalently linked to the thermoset rubber that results upon curing the thermosetting rubber formulation. The supramolecule building blocks are chosen according to their ability to self-assemble into sheet-like secondary structures through hydrogen bonding. In the thermosetting rubber, the supramolecule building blocks form a plurality of sheet-like structures through hydrogen bonding, and these sheets interact through non-covalent interactions such as van der Waals forces and dipole-dipole interactions and form crystallized domains (nanoassemblies) within the thermoset rubber.

The rubber employed may be virtually any thermosetting rubber. The rubber will have unsaturated active sites that crosslink upon curing to form the thermoset rubber.

In some embodiments, the thermosetting rubber is selected from the group consisting of polybutadiene, polyisoprene, poly(styrene-co-butadiene), poly (isobutylene-co-isoprene), natural rubber or a combination thereof.

In some embodiments, suitable supramolecule building blocks are selected from peptides, β-peptides, aramid oligomers, and bis-ureas. In some embodiments, suitable supramolecule building blocks are selected from peptides having from 1 to 10 amino acid residues. Suitable peptides include, but are not limited to, alanine, β-alanine, alanine-glycine, leucine, and isoleucine. In some embodiments, the supramolecule building blocks are oligo-β-alanines. In some embodiments, the supramolecule building blocks are aramid oligomer. In some embodiments, the supramolecule building blocks are bis-ureas.

In some embodiments, the supramolecule building blocks are β-alanines according to the following structures:

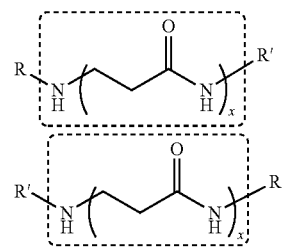

where the structural motif enclosed in the dotted frame is the supramolecule building block, wherein x is not to be limited to any particular number. In some embodiments, x will be from 1 to 10. In some embodiments, x will be from 2 to 6. In some embodiments, x will be from 2 to 4. This structure forms stacked β-sheets (beta sheets) through hydrogen bonding. These sheets associate into nanoassemblies through van der Waal forces and perhaps dipole-dipole interactions that segregate from the rubber to form crystalline domains. The R and R' groups may be the same or different and at least one is a moiety suitable for carrying out a method of linking the supramolecule building block to the thermoset rubber as described herein. In some embodiments, both R and R' will be suitable for covalently linking the supramolecule building block to a thermosetting rubber or a curable functional group as describe more fully herein below. In other embodiments, one R group is a non-reactive group chosen to avoid reacting with a thermosetting rubber or a curable functional group, while the other R group is suitable for covalently linking the supramolecule building block to a thermosetting rubber or a curable functional group as describe more fully herein below.

In some embodiments, the supramolecule building blocks are aramids according to the following structures:

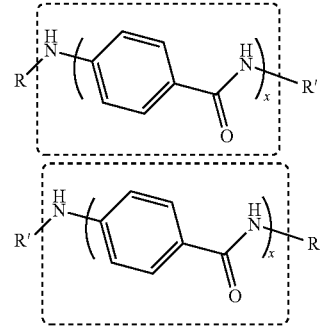

where the structural motif enclosed in the dotted frame is the supramolecule building block, wherein x is not to be limited to any particular number. In some embodiments, x will be from 1 to 10. In some embodiments, x will be from 2 to 6. In some embodiments, x will be from 2 to 4. This structure forms sheets through hydrogen bonding. These sheets associate into nanoassemblies through van der Waal forces and perhaps dipole-dipole interactions that segregate from the rubber to form crystalline domains. The R and R' groups may be the same or different and represent any moiety suitable for carrying out a method of linking the supramolecule building block to the thermoset rubber as described herein. In some embodiments, both R and R' will be suitable for covalently linking the supramolecule building block to a thermosetting rubber or a curable functional group as describe more fully herein below. In other embodiments, one R group is a non-reactive group chosen to avoid reacting with a thermosetting rubber or a curable functional groups, while the other R group is suitable for covalently linking the supramolecule building block to a thermosetting rubber or a curable functional group as describe more fully herein below.

In some embodiments, the supramolecule building blocks are aramids according to the following structures:

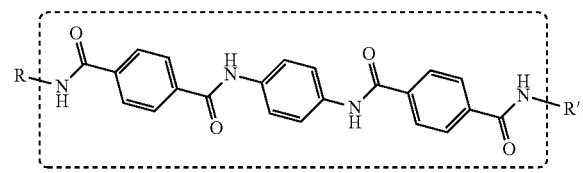

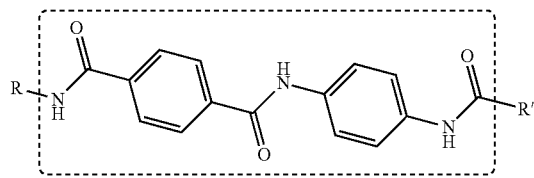

where the structural motif enclosed in the dotted frame is the supramolecule building block. This structure forms antiparallel stacked sheets through hydrogen bonding. These sheets associate into nanoassemblies through van der Waal forces and perhaps dipole-dipole interactions that segregate from the rubber to form crystalline domains. The R and R' groups may be the same or different and represent any moiety suitable for carrying out a method of linking the supramolecule building block to the thermoset rubber as described herein. In some embodiments, both R and R' will be suitable for covalently linking the supramolecule building block to a thermosetting rubber or a curable functional group as describe more fully herein below. In other embodiments, one R group is a non-reactive group chosen to avoid reacting with a thermosetting rubber or a curable functional groups, while the other R group is suitable for covalently linking the supramolecule building block to a thermosetting rubber or a curable functional group as describe more fully herein below.

In some embodiments, the supramolecule building blocks are aramids according to the following structures:

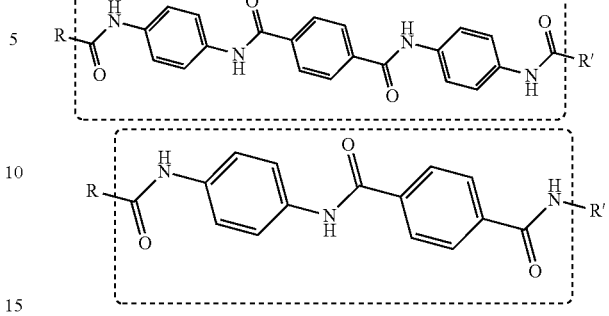

where the structural motif enclosed in the dotted frame is the supramolecule building block, R is a covalently linking unit, and R' is an end cap, as discussed above; or R and R' are both covalently linking units. This structure forms antiparallel stacked through hydrogen bonding. These sheets associate into nanoassemblies through van der Waal forces and perhaps dipole-dipole interactions that segregate from the rubber to form crystalline domains. The R and R' groups may be the same or different and represent any moiety suitable for carrying out a method of linking the supramolecule building block to the thermoset rubber as described herein. In some embodiments, both R and R' will be suitable for covalently linking the supramolecule building block to a thermosetting rubber or a curable functional group as describe more fully herein below. In other embodiments, one R group is a non-reactive group chosen to avoid reacting with a thermosetting rubber or a curable functional groups, while the other R group is suitable for covalently linking the supramolecule building block to a thermosetting rubber or a curable functional group as describe more fully herein below.

In some embodiments, the supramolecule building blocks are aramids according to the following structure:

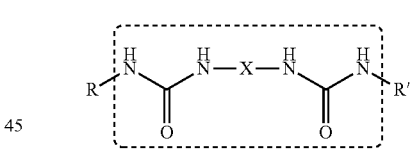

where the structural motif enclosed in the dotted frame is the supramolecule building block, X is an alkylene or arylene group containing 2 to 8 carbon atoms. This structure forms antiparallel stacked sheets through hydrogen bonding. These sheets associate into nanoassemblies through van der Waal forces and perhaps dipole-dipole interactions that segregate from the rubber to form crystalline domains. The R and R' groups may be the same or different and represent any moiety suitable for carrying out a method of linking the supramolecule building block to the thermoset rubber as described herein. In some embodiments, both R and R' will be suitable for covalently linking the supramolecule building block to a thermosetting rubber or a curable functional group as describe more fully herein below. In other embodiments, one R group is a non-reactive group chosen to avoid reacting with a thermosetting rubber or a curable functional groups, while the other R group is suitable for covalently linking the supramolecule building block to a thermosetting rubber or a curable functional group as describe more fully herein below.

In some embodiments, the supramolecule building blocks are covalently linked to a thermosetting rubber of a thermosetting rubber formulation, the thermosetting rubber including unsaturated active sites that crosslink upon curing to form the thermoset rubber. This can be generally represented by the following schematics:

[SMBB]-[TSR], and

[TSR]-[SMBB]-[TSR]

wherein TSR is a thermosetting rubber having unsaturated active sites, SMBB is a supramolecule building block and the connecting line between indicates a covalent linkage. This covalent linkage is not limited to a direct covalent bond between atoms of the thermosetting rubber and atoms of the supramolecule building block, but can include not only the atoms participating in the covalent bond, but others spacing the TSR from the SMBB. In many instances, functional groups extending from the SMBB and the TSR will react to create the covalent linkage. The SMBB may be pendant to the main polymeric chain of the TSR or may be within the polymeric chain. After the SMBB is covalently linked to the TSR, the rubber is mixed and the thermosetting rubber is subsequently crosslinked to become a thermoset rubber with the supramolecule building blocks forming the crystallized domains in the thermoset rubber.

In some embodiments, a thermosetting rubber with pendant functionality is reacted with a supramolecule building block having attached functionality so as to covalently bond the supramolecule building block to the thermosetting rubber. After shear mixing to disperse the supramolecule building blocks, the thermosetting rubber is then crosslinked to form the thermoset rubber with the supramolecule building blocks forming crystalline domains therein.

The thermosetting rubber with attached supramolecule building blocks can be crosslinked alone or can be mixed with other thermosetting rubbers to create rubber blends thereafter crosslinked to form the thermoset rubber with supramolecule building blocks forming crystalline domains therein.

In some embodiments, the mole fraction of the pendant functionality on the thermosetting rubber is from 0.5 to 10 mol %. In other embodiments the pendant functionality on the thermosetting rubber is from 0.5 to 8 mol %, in other embodiments, from 2 to 6 mol %, and in other embodiments, from 2 to 5 mol %.

In other embodiments, the supramolecule building blocks are first covalently linked to a moiety having curable functional groups, to form what is called herein a supramolecular filler, and this supramolecular filler is thereafter mixed with a thermosetting rubber. The curable functional groups covalently bond the supramolecule building block to the thermosetting rubber of the rubber formulation during mixing or subsequent curing step. Those skilled in the art will appreciate the possibility of the curable functional groups (such as carbon-carbon double bonds or vinyl groups) to form radicals and bind with the thermosetting rubber. It will be appreciated that crosslinking might occur through any number of mechanisms, including those requiring catalysts or other chemical additions or process conditions (e.g., UV radiation, temperature), or those not requiring any special additions or process steps, for example, when thermosetting rubber cure simply in air. The curable functional groups serve to covalently link the remainder of the supramolecular filler to the resulting thermoset rubber.

The supramolecular filler can be generally represented by the following schematic:

[SMBB]-[CFG]

wherein CFG is a curable functional group, SMBB is a supramolecule building block and the connecting line between indicates a covalent linkage. This covalent linkage is not limited to a direct covalent bond between atoms of the curable functional group and atoms of the supramolecule building block, but can include not only the atoms participating in the covalent bond, but others spacing the CFG from the SMBB. In some such embodiments, in order to be covalently linked with the rubber, the curable functional group is a carbon-carbon double bond, a vinyl group or a thiol group. Depending upon the thermosetting rubber, appropriate process conditions and/or additions (catalysts and the like) are employed to cause the curable functional groups to covalently bond with the thermosetting rubber.

In other embodiments, the supramolecular filler can be represented by the following schematics:

[CFG]-[SMBB]-[CFG], and

[SMBB]-[CFG]-[SMBB].

The supramolecular filler is added to a thermosetting rubber and mixed, and the curable functional groups covalently link the remainder of the supramolecular filler, and particularly the supramolecule building block, to the thermosetting rubber during a crosslinking step.

In some embodiments, the supramolecule building block is present in the final thermoset at from 0.5 to 50 parts per hundred rubber (phr). In other embodiments, the supramolecular filler is present at from 0.5 to 40 phr, in other embodiments, from 0.5 to 30 phr, in other embodiments, from 0.5 to 20 phr, in other embodiments, from 0.5 to 10 phr, and in other embodiments, from 0.5 to 5 phr.

For general thermoset rubber reinforcement in such applications as tires, shoe soles, hoses, and conveyor belts, additives such as carbon black, stearic acid, antioxidants, waxes and silica may be included in conventional amounts known in the prior art in addition to the thermosetting rubber(s) and SMBB. In some embodiments, due to the domains provided by the SMBB, the amount of conventional filler such as carbon black or silica can be reduced or completely eliminated.

In tire applications, additives such as carbon black, stearic acid, antioxidants, waxes, silica, retarders, sulfur, accelerators or materials of the like, may be included in conventional amounts in addition to the thermosetting rubber(s) and SMBB. In some embodiments, due to the domains provided by the SMBB, the amount of conventional filler such as carbon black or silica can be reduced or completely eliminated.

In order to introduce a SMBB into the rubber, a functional SMBB and a functional thermosetting rubber must first be provided. Next, the SMBB and thermosetting rubber are reacted to covalently bond the SMBB to the rubber. Optionally, this composition may be added to other thermosetting rubber. Once the SMBB segments are covalently attached to the rubber, shear mixing will disperse the supramolecule building blocks during the mixing step. Further, standard additives may be added at the appropriate stages and in no particular order. Once mixing is complete, a subsequent crosslinking or vulcanization step will form the thermoset rubber from the crystalline domains of the SMBB.

In tire applications, the thermosetting rubber may be selected from the group consisting of styrene-butadiene rubber, polybutadiene rubber, butadiene rubber, polyisoprene or derivatives thereof. Standard additives include, but are not limited to, carbon black, stearic acid, antioxidants, waxes, silica, retarders, sulfur, accelerators or materials of the like. Such standard additives may be added in the appropriate stages and amounts, if necessary.

Another method of the present invention provides covalent attachment which occurs during mixing or vulcanization. A supramolecular filler is first provided, wherein the supramolecular filler includes an SMBB and a curable functional group that are covalently attached. Next, the supramolecular filler is added to the thermosetting rubber, and mixed. Once the mixing step is complete, standard additives may be added at the appropriate stages. Curatives such as sulfur and TBBS are added, if necessary. The curable functional groups will covalently link to thermosetting rubber forming the thermoset rubber with crystalline domains from the SMBB. Some systems may cure upon drying, applying heat or a UV cure.

In a particular embodiment, a styrene-butadiene thermosetting rubber including pendant carboxylic acid groups is reacted with a supramolecule building block having attached amine functionality so as to graft the supramolecule building block onto the styrene-butadiene thermosetting rubber through covalent bonds.

In some embodiments employing a supramolecular filler having a supramolecular building block and a curable functional group, the supramolecular filler is a peptide-terminated polymer, the curable functional group being provided by the a polymer having carbon-carbon double bond or vinyl groups or both for crosslinking with the thermosetting rubber upon mixing and curing, and the supramolecule building block including short peptide segments. The short peptide segments of the supramolecular filler tend to form multiple hydrogen bonds with neighboring peptide segments to form β-sheets or sheet secondary structures of the type described in J. Poly. Sci. Part A-2 1970, 8, 1703, the disclosure of which is incorporated herein by reference in its entirety. Some suitable amino acids include, but are not limited to alanine, β-alanine, glycine, leucine, and isoleucine. In some embodiments, the peptide segment is an oligo(alanine). In some embodiments, the peptide segment is an oligo(alanine-glycine). In other embodiments, the peptide segment is an oligo(β-alanine). The peptide segments may be synthesized stepwise using standard solution-phase procedures for coupling amino acids known in the art or other known and unknown methods.

The peptides used are relatively short, having from 2 to 10 amino acid residues. In some embodiments, the peptides have from 2 to 6 amino acid residues. In some embodiments, the peptides have from 2 to 5 amino acid residues.

In some embodiments, the peptides are selected from the group consisting of alanine, β-alanine, alanine-glycine, leucine, and isoleucine.

In some embodiments, the polymer is elected from the group consisting of polyisoprene, polybutadiene, poly(styrene-co-butadiene), poly(isobutylene-co-isoprene), natural rubber, or combinations and/or derivatives thereof. In some embodiments, the peptide terminated polymer comprises a peptide terminated polybutadiene.

Processes for making such supramolecular fillers are found in co-pending PCT/US13/37974, incorporated herein by reference. Telechelic polymer is employed, with peptides bound thereto. It is intended that the peptides bind only to the functional end groups of the telechelic polymer, and not become incorporated into other parts of the telechelic polymer. To prevent this, one end of the peptide may be "capped" to prevent it from reacting with the polymer. Capping moities are well known in the art and may be any organic or inorganic substance capable of bonding to one end of the peptide and not binding with the telechelic polymer. Selection of capping groups is generally well understood in the art, but the selection will depend, among other things, upon such factors as the particular peptide used, the particular polymer used, the end of the peptide to be reacted to the functional end groups of the polymer, and the identity of the functional end group. Suitable capping groups may include, for example, an acetyl group, an m-toluoyl group, an isobutyl amido group, or a hydrogen atom. In some embodiments, the capping group is an acetyl group. In some embodiments, the capping group is an m-toluoyl group. In some embodiments, the capping group is a hydrogen atom. In some embodiments, the capping group is an isobutyl amido group.

It is the other (non-capped) end of the peptide that bonds to the functional end groups of the telechelic polymer to form these specific supramolecular fillers of the present invention. It should be appreciated that depending upon the particular functional end groups used and which end of the peptide is the (non-capped) free end of the of the peptide, it is sometimes necessary to functionalize or activate the (non-capped) free end of the peptide so that it can be attached to the functional end groups of the polymer used. It should also be appreciated that depending upon the particular way in which the (non-capped) free end of the of the peptide is functionalize or activated, it is sometimes necessary to functionalize or activate the functional end groups of the polymer used in order for the peptide and the polymer to be coupled with each other.

The peptide may be activated by any method known in the art. In some embodiments, the peptide may be activated by reacting it with a succimidal carbonate. In some embodiments, the peptide may be activated by reacting it with a carbodiimides In some embodiments, the supramolecular filler has the formula:

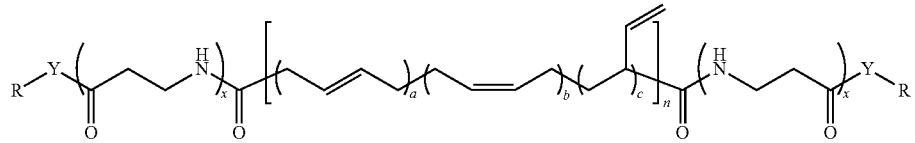

(I)

wherein a, b, and c are the fraction of each isomer of butadiene, each of said isomers comprising from 0% to 100% of a polybutadiene segment such that the total percentage of the isomers is 100% of the polybutadiene segment; n is a number average degree of polymerization of from 1 to 50,000; x is an integer from about 2 to about 10;

Y is C, O or NH; and R is a hydrogen atom, an organic group, or inorganic group. Further, as shown below and in FIG. 1,

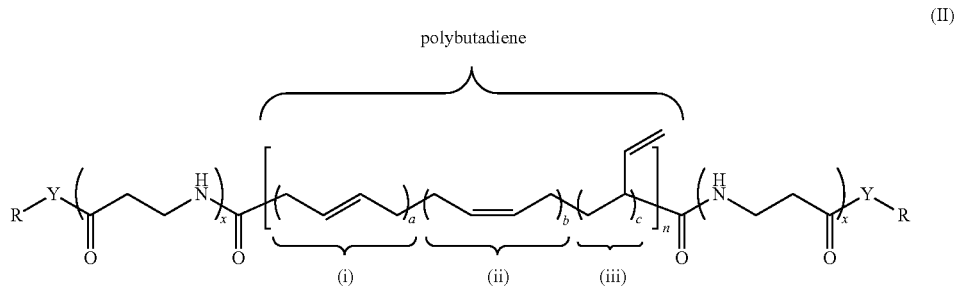

wherein a is the fraction of the 1,4-trans-butadiene isomer of PBD segment (isomer (i)) and may comprise from 0% to 100% of the polybutadiene segment; b is the fraction of the 1,4-cis-butadiene isomer of PBD isomer (ii)) and may comprise from 0% to 100% of the polybutadiene segment; and c is the fraction of 1,2-butadiene isomer of PBD (isomer (iii)) segment and may comprise from 0% to 100% of the polybutadiene. In some embodiments, R is a hydrogen atom, an alkyl group or an aryl group. In some embodiments, the ratio a:b:c of isomers (i):(ii):(iii) in the polybutadiene is about 4:5:2. In some embodiments, x is an integer from 2 to 6.

In some embodiments, the supramolecular filler is chosen according to the above formulae (I) and (II), and Y is chosen from NH, O, and C; R is chosen from iso-butyl, methyl, and ethyl; x is from 2 to 10; n is greater than 50.

In some embodiments, the supramolecule building block is present in the final thermoset at from 0.5 to 50 parts per hundred rubber (phr). In other embodiments, the supramolecular filler is present at from 0.5 to 40 phr, in other embodiments, from 0.5 to 30 phr, in other embodiments, from 0.5 to 20 phr, in other embodiments, from 0.5 to 10 phr, and in other embodiments, from 0.5 to 5 phr.

In some embodiments employing a supramolecular filler having a supramolecule building block and a curable functional group, the supramolecular filler is and aramid-based supramolecule building block having a covalent linkage to thiol as a curable functional group for crosslinking with the thermosetting rubber upon mixing and curing. The monodispersed aramid-based supramolecule building block tend to form multiple hydrogen bonds with neighboring aramid-based supramolecule building block to form sheet secondary structures of the type described in Progress in Polymer Science 2011, 36, 713, the disclosure of which is incorporated herein by reference in its entirety. In some embodiments the supramolecular filler has the formula:

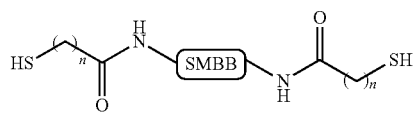

wherein SMBB represents any of the broad genus or any of the more specific species of supramolecule building blocks described herein, and n is 2 or greater. In some embodiments, n is from 2 to 16. In some embodiments, n is 6 or greater. It has been found that a longer organic spacer (n being 6 or greater) is beneficial in helping to disperse the supramolecular filler in thermosetting rubbers. In some embodiments, the supramolecular filler has the formula:

(II)

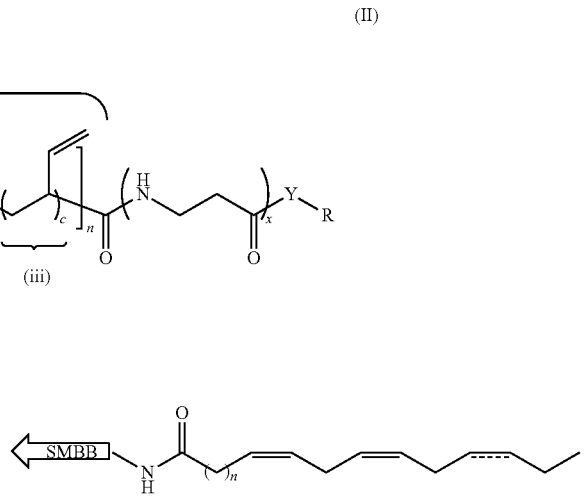

wherein SMBB represents any of the broad genus or any of the more specific species of supramolecule building blocks described herein, and n is greater than 2. In some embodiments, n is from 2 to 10. In some embodiments, n is 7.

The supramolecule building block of the present invention optimizes energy dissipation. Under normal tire running conditions that correspond to relatively low frequency and low amplitude of deformation, the supramolecule building block is expected to remain intact. Energy loss, and hence rolling resistance, will be low. Upon acceleration and deceleration at relatively high frequency and high amplitude of deformation, the supramolecular fillers are expected to absorb mechanical energy by reversible breakage of van der Waals interactions. This will increase traction and wet skid resistance.

The breakage of physical bonds will lessen the rupture of network covalent bonds, thereby reducing network damage and, thus, enhance tear strength and abrasion resistance. At a higher stress, where cracking would normally develop, energy absorption by breakage of multiple hydrogen bonds and destruction of the sheets prevent crack growth. Restoration of the supramolecule building block depends on the severity of atom displacement from their original positions. The thresholds for the mechanical force to break the van der Waals interactions and hydrogen bonds can be adjusted by changing the length of the supramolecule building blocks (such as by changing the length of the alanine repeat units) and other structural details at the molecular level.

In light of the foregoing, it should be appreciated that the present invention significantly advances the art by providing a composition for reinforcing thermoset rubber utilizing the crystalline domains formed by supramolecule building blocks. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

EXAMPLES

Materials

SBR (Plioflex 1502, Goodyear), PBD ($M_n$=5600, PDI=1.5, Emerald), N115 carbonblack (Cabot), sulfur (Akrochem), N-t-butyl-2-benzothiazole sulfenamide (TBBS, Akrochem), N-(1,3-dimethyl butyl)-N'-phenyl-p-phenylene diamine (Antioxidant PD-2, Akrochem), Retarder CTP (Akrochem), 2,2,4-trimethyl-1-2-hydroquinoline (Antioxidant DQ, Akrochem), Akrowax™ Micro23 (Akrochem), ZnO (Akrochem), and stearic acid (Akrochem). The PBD-ALA used in the present invention was synthesized according to previously reference PCT/US13/37974, and had the following formula:

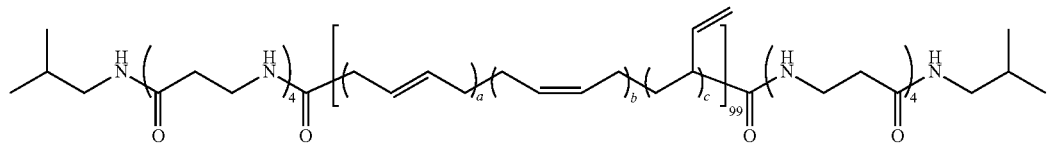

PBD-ALA; a:b:c = 5:4:2

Formulations

The formulations of SBR-PBD-ALA are given, for example, in Table 1 below.

TABLE 1

Formulations.

|  | SBR | SBR-PBD-ALA | SBR-PBD |
|---|---|---|---|
| SBR 1502 | 100 | 73 | 73 |
| PBD-ALA | — | 27 | — |
| PBD | — | — | 27 |
| Carbon Black (N115) | 20 | 20 | 20 |
| Stearic Acid (F-300) | 1.8 | 1.8 | 1.8 |
| ZnO (FP-Z) | 3.5 | 3.5 | 3.5 |
| PD-2 | 1.5 | 1.5 | 1.5 |
| Antioxidant DQ | 1 | 1 | 1 |
| Akrowax (Micro 23) | 1 | 1 | 1 |
| Retarder CTP | 0.1 | 0.1 | 0.1 |
| Sulfur | 1.75 | 1.75 | 1.75 |
| TBBS | 0.75 | 0.75 | 0.75 |

Mixing and Milling

The preparation of master batches was carried out in a 80 cc Brabender Mixer using a fill factor of 0.82-0.86. The preparation of the rubber compositions was carried out a temperature of 80° C., and the rotor speed was 60 rpm. The mixing procedure is shown in Table 2.

TABLE 2

Mixing Procedure

| Step | Time (min) | Component added |
|---|---|---|
| 1 | 0-1.5 | SBR or SBR + PBD or SBR + PBD-ALA |
| 2 | 1.5-2 | ½ carbon black |
| 3 | 2-4 | ZnO, stearic acid, CTP, DQ, PD-2, other ½ carbon black |
| 4 | 4-7 | Wax |
| 5 | 7 | Dump and weigh |

After preparing the masterbatch, curatives such as sulfur and TBBS, were added on a two-roll mill (Farrel, 15 cm diameter and 30 cm roll length). Compounds were milled for one minute and then curatives were slowly added to the bank with alternating cuts. Milled sheets were then taken off the mill after 10 end-roll passes at 1.0 mm.

Vulcanization

Vulcanization kinetics were determined from rheometer curves using an Alpha Moving Die Rheometer 2000 at 160° C. (FIG. 1). The cure time tc (100) was the time to first reach maximum torque. Unvulcanized milled sheets (about 10×10×0.2 cm) were placed in the center of a window mold (160×160×0.5 mm). Thereafter, Mylar films and two aluminum plates were placed on each side. Sheets were cured at 160° C. to [tc (90)+10] min in a Dake hydraulic press under a load of about 30 tons and then quenched in water.

Uncut Tensile Testing

For the uncut tensile testing, tensile specimens were cut with an ASTM D 412-89 Type C dumbbell die. Bench marks were then placed on the mid-portion approximately 30.0 mm apart. Three tensile specimens were tested for each case using an Instron model 5567. A video system was used to measure strain. The crosshead speed was 50 mm/min; initial grip separation was 60 mm.

Results

Uncut Tensile Test

Figure 5:
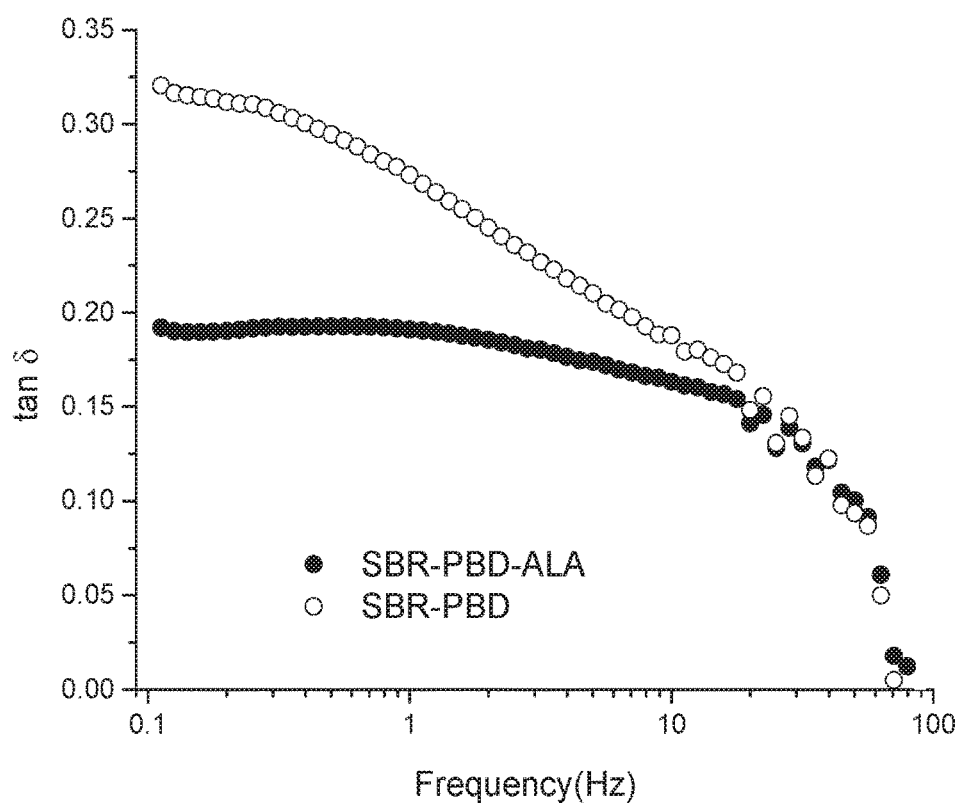
FIG. 5 is a graph showing the results of a dynamic mechanical analysis carried out at room temperature, and a strain amplitude of 10%, measuring the frequency dependence of loss factor tan δ, prepared according to one embodiment of the present invention.

The strain-stress curves of vulcanizates SBR-PBD-ALA and SBR-PBD are compared in FIG. 5. The vulcanizate SBR is used as a standard to gauge the validity of the data. The ultimate strength and elongation are summarized in Table 3. The ultimate elongation of SBR-PBD-ALA and SBR-PBD are similar, but the tensile strength of SBR-PBD-ALA is about 40% higher than that of SBR-PBD.

TABLE 3

Tensile Stress and Strain of Rubber Samples.

| Item | Tensile stress at Preset Point (MPa) | Strain at Preset Point (%) |
|---|---|---|
| SBR | 21.98 | 725 |
| SBR-PBD-ALA | 12.10 | 751 |
| SBR-PBD | 8.52 | 759 |

Dynamic Mechanical Analysis

Figure 4:
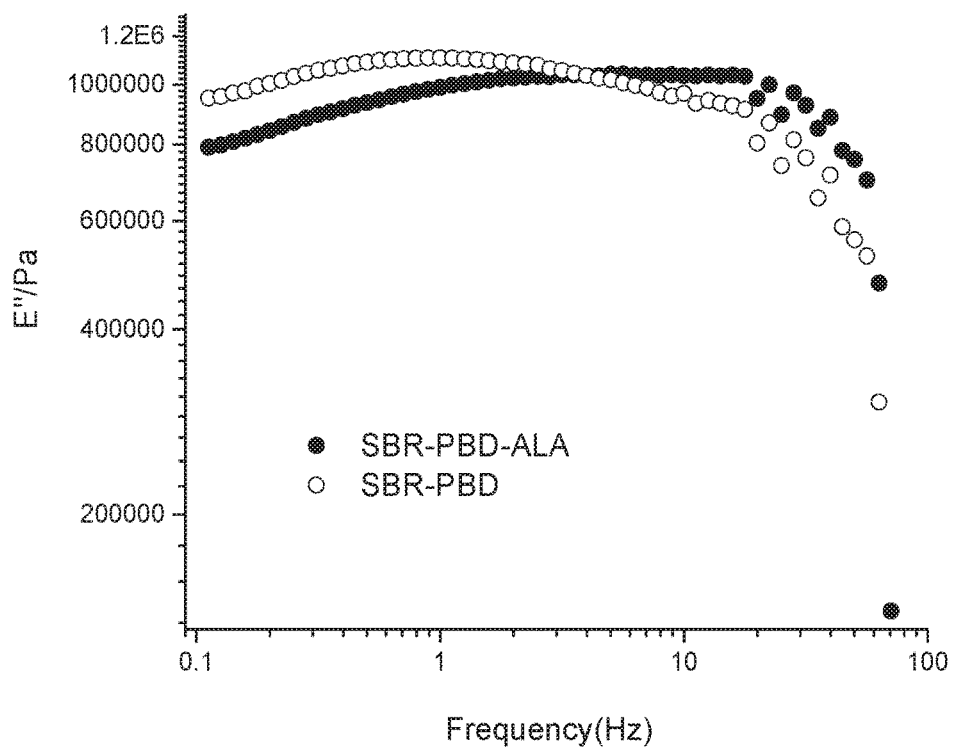
FIG. 4 is a graph showing the results of a dynamic mechanical analysis carried out at room temperature, and a strain amplitude of 10%, measuring the frequency dependence of loss modulus E", prepared according to one embodiment of the present invention.
Figure 6:
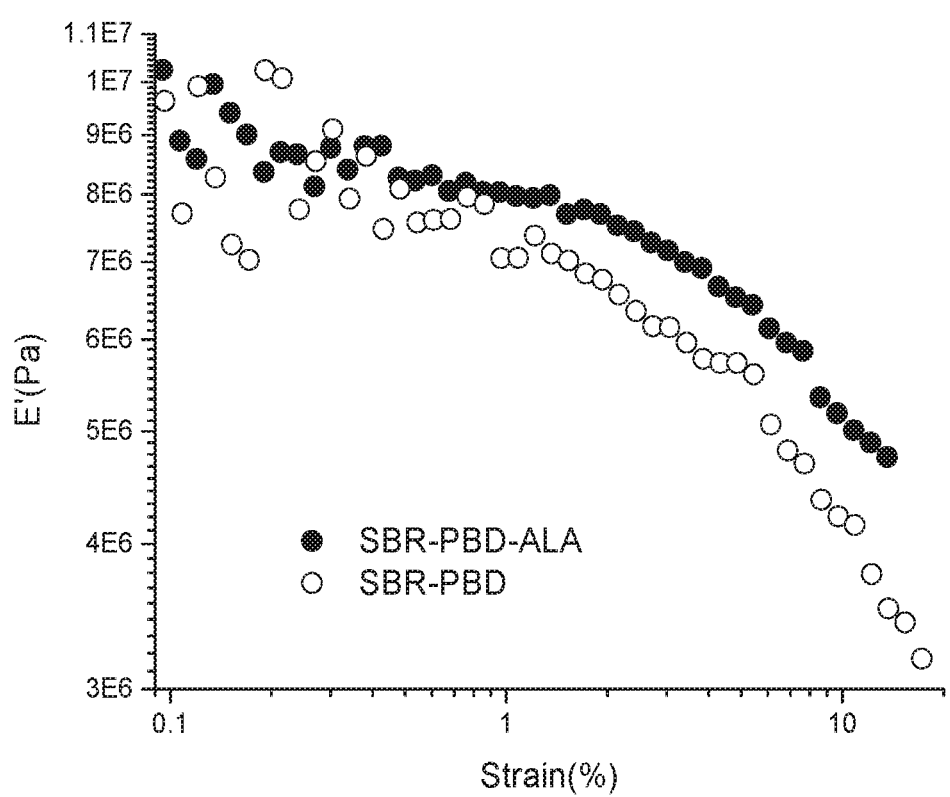
FIG. 6 is graph showing the results of a dynamic mechanical analysis carried out at room temperature, at a frequency of 10 Hz, measuring the strain dependence of storage modulus E', prepared according to one embodiment of the present invention.

The frequency sweep tests of the three rubber compounds were carried out at room temperature (23.9° C.) at a strain amplitude of 10%. The results are shown in FIGS. 4-6.

Figure 7:
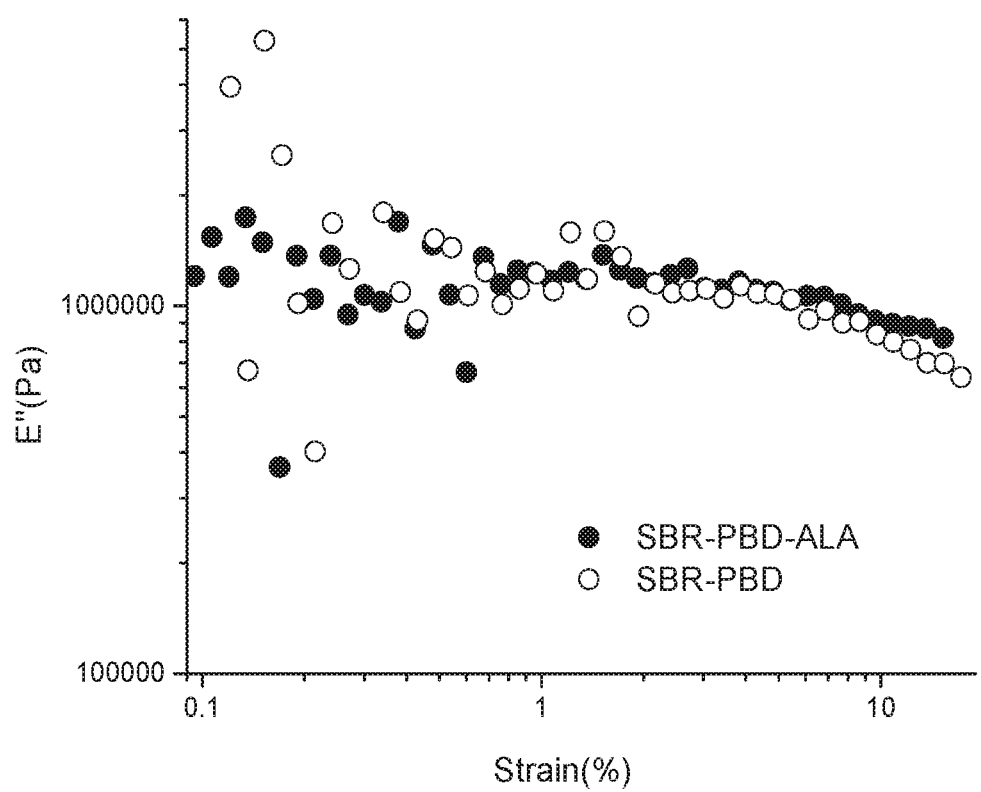
FIG. 7 is graph showing the results of a dynamic mechanical analysis carried out at room temperature, at a frequency of 10 Hz, measuring the strain dependence of storage modulus E", prepared according to one embodiment of the present invention.
Figure 8:
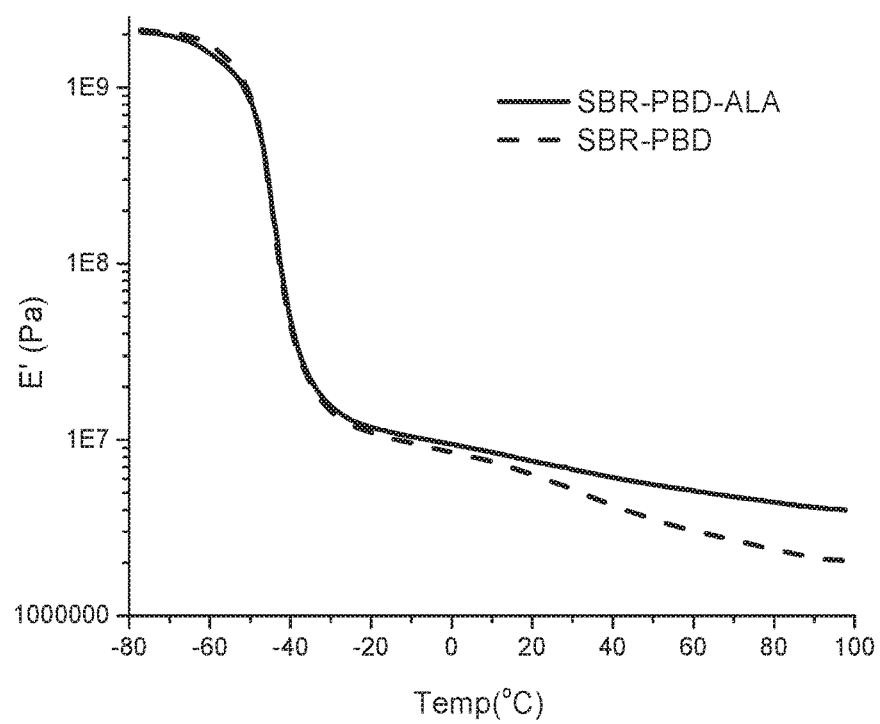
FIG. 8 is graph showing the results of a dynamic mechanical analysis carried out at temperatures between −80-100° C., measuring the temperature dependence of storage modulus E', prepared according to one embodiment of the present invention.
Figure 9:
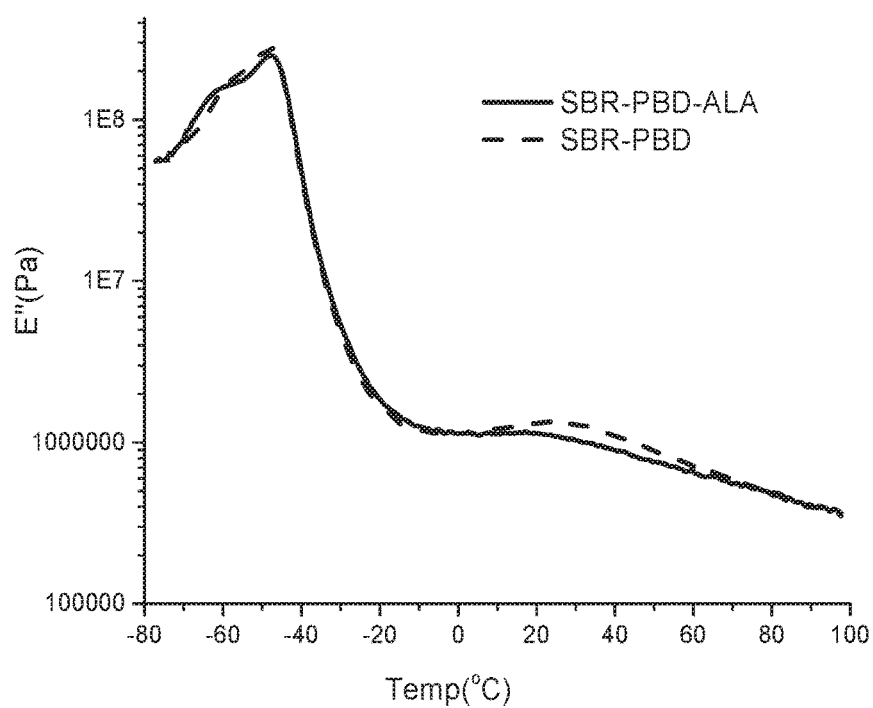
FIG. 9 is graph showing the results of a dynamic mechanical analysis carried out at temperatures between −80-100° C., measuring the temperature dependence of loss modulus E", prepared according to one embodiment of the present invention.
Figure 10:
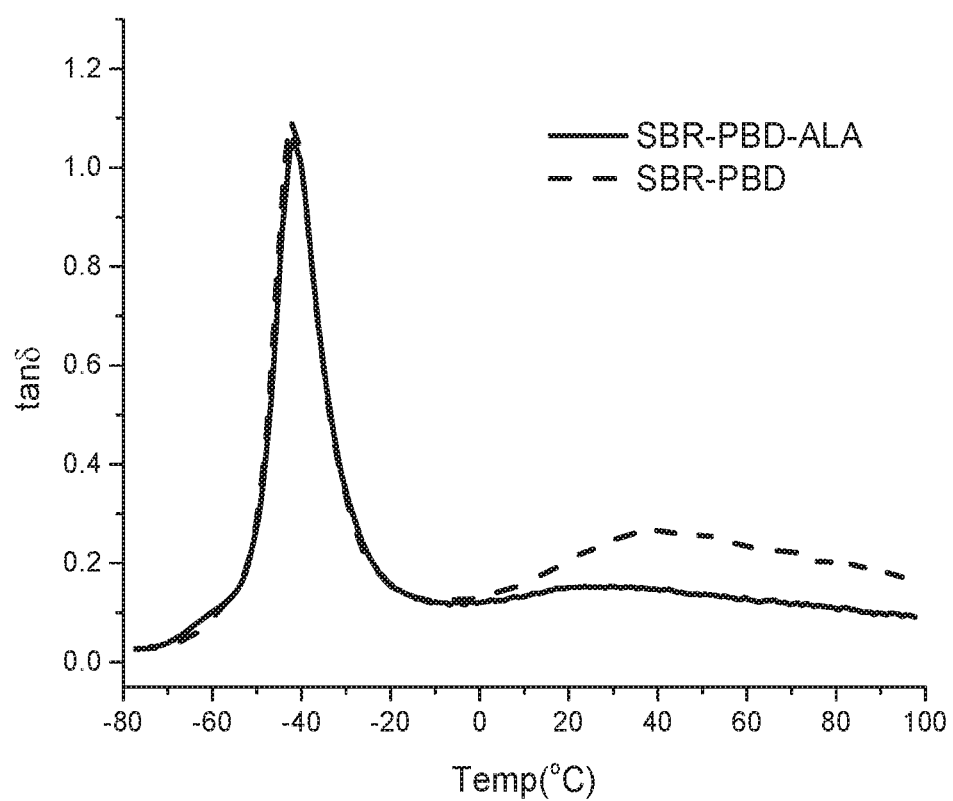
FIG. 10 is graph showing the results of a dynamic mechanical analysis carried out at temperatures between −80-100° C., measuring the temperature dependence of loss factor tan δ, prepared according to one embodiment of the present invention.

The strain amplitude sweep tests of the three rubber compounds were carried out at room temperature (23.9° C.) at a frequency of 10 Hz. The results are shown in FIGS. 7 and 8. The decrease in the storage modulus of SBR-PBD-ALA with amplitude is therefore less pronounced in comparison to SBR-PBD.

The temperature sweep tests were carried out at frequency of 1 Hz and at a strain amplitude of 0.2%. The temperature range is −80-100° C., and the heating rate is 4° C./min. The results are shown in FIGS. 9-12. A sharp drop in the storage modulus can be observed at −50° C.~−30° C. for SBR-PBD-ALA and SBR-PBD and at −45° C.~−25° C. for SBR. This is the result of glass transition and is consistent with that the $T_g$ of SBR is higher than that of the blends of SBR and low molecular weight PBD. In the rubbery region (−25° C.-100° C.), SBR-PBD-ALA shows the highest storage modulus, suggesting the polymer-filler interaction enhances the ability to resist intermolecular slippage. Similarly, the loss modulus reaches the maximum shortly after the glass transition.

The storage modulus E', loss modulus E" and loss factor tan δ of the three samples at about 60° C. are listed in Table 4.

TABLE 4

Storage modulus E', loss modulus E" and loss factor tanδ at 60° C.

|  | SBR | SBR-PBD-ALA | SBR-PBD |
| --- | --- | --- | --- |
| E' (Pa) | $4.24 \times 10^6$ | $5.12 \times 10^6$ | $3.04 \times 10^6$ |
| E" (Pa) | $4.78 \times 10^5$ | $6.42 \times 10^5$ | $7.08 \times 10^5$ |
| tanδ | 0.113 | 0.125 | 0.233 |

The storage modulus of SBR-PBD-ALA is much higher than that of SBR-PBD, while the loss modulus of SBR-PBD-ALA is somewhat lower than that of SBR-PBD. Thus, the loss factor of SBR-PBD-ALA (0.125) is almost reduced to half of that of SBR-PBD (0.233). The above results reveal that the oligo-β-alanine effectively increases the storage modulus and decreases the loss factor.

The storage modulus E', loss modulus E" and loss factor tan δ of the three samples at about 0° C. are listed in Table 5.

TABLE 5

Storage modulus E', loss modulus E" and loss factor tanδ at ~0° C.

|  | SBR | SBR-PBD-ALA | SBR-PBD |
| --- | --- | --- | --- |
| E' (Pa) | $7.46 \times 10^6$ | $9.43 \times 10^6$ | $8.55 \times 10^6$ |
| E" (Pa) | $1.01 \times 10^6$ | $1.14 \times 10^5$ | $1.14 \times 10^6$ |
| tanδ | 0.135 | 0.121 | 0.132 |

The storage modulus and loss modulus of SBR-PBD and SBR-PBD-ALA are very similar at 0° C. If we use the loss factors at the two temperatures as the indicators for rolling resistance and wet skid-resistance, SBR-PBD-ALA has significantly lower rolling resistance than SBR-PBD while sacrificing very little in wet-skid resistance. It should be pointed out that comparison for the filler effect between SBR and SBR-PBD-ALA or SBR-PBD cannot be made because of the difference in crosslink density in the two vulcanizates due to the difference in vulcanization propensity of the base polymers.

What is claimed is:

1. A thermoset rubber composition comprising;
a thermoset rubber having crystallized domains dispersed therein, the crystallized domains being formed of supramolecule building blocks forming a plurality of sheet-like structures through hydrogen bonding, the sheet-like structures interacting through non-covalent interactions to form the crystallized domains within the thermoset rubber, wherein the supramolecule building blocks are selected from peptides, β-peptides, aramid oligomers, and bis-ureas.

2. The thermoset rubber composition of claim 1, wherein the supramolecule building blocks are covalently linked to said thermoset rubber.

3. A thermoset rubber composition comprising:
a thermoset rubber having crystallized domains dispersed therein, the crystallized domains being formed of supramolecule building blocks forming a plurality of sheet-like structures through hydrogen bonding, the sheet-like structures interacting through non-covalent interactions to form the crystallized domains within the thermoset rubber, wherein the supramolecule building blocks are β-alanines according to the following structure:

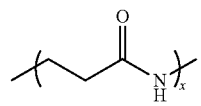

wherein x is from 1 to 8.

4. A thermoset rubber composition comprising:
a thermoset rubber having crystallized domains dispersed therein, the crystallized domains being formed of supramolecule building blocks forming a plurality of sheet-like structures through hydrogen bonding, the sheet-like structures interacting through non-covalent interactions to form the crystallized domains within the thermoset rubber, wherein the supramolecule building blocks are aramids according to one of the following structures:

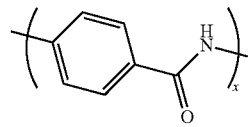

wherein x is from 1 to 8.

5. The thermoset rubber composition of claim 1, wherein the supramolecule building blocks are aramids according to one of the following:

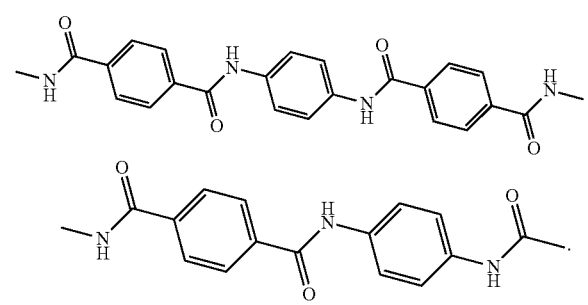

6. The thermoset rubber composition of claim 1, wherein the supramolecule building blocks are aramids according to one of the following:

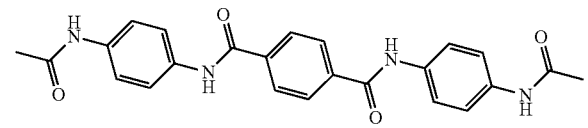

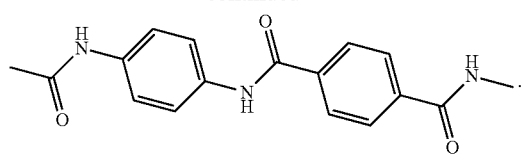

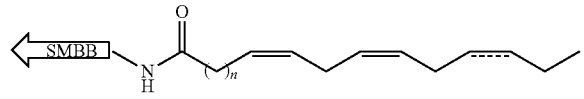

wherein SMBB represents a supramolecular building block and n is 2 or greater.

7. The thermoset rubber composition of claim 1, wherein the supramolecule building blocks are aramids according to one of the following structure:

12. The process of claim 9, wherein the supramolecular filler has the following structure:

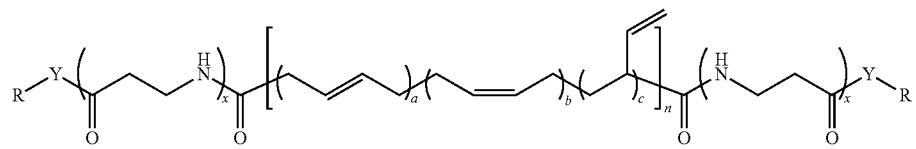

wherein a, b, and c are the fraction of each isomer of butadiene, each of said isomers comprising from 0% to 100% of a polybutadiene segment such that the total percentage of the isomers is 100% of the polybutadiene segment; n is a number average degree of polymerization of 50,000 or less; x is an integer from 2 to about 10; Y is selected from C, O or NH; and R is a hydrogen atom, an organic group, or inorganic group.

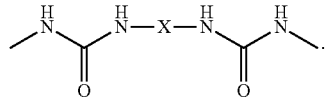

8. The rubber composition of claim 1, wherein said thermoset rubber is selected from the group consisting of polybutadiene, styrene-butadiene (SBR), polyisoprene, derivatives thereof and mixtures thereof.

9. A process of forming a reinforced thermoset rubber comprising the steps of:
  covalently linking supramolecule building blocks to a curable functional group to form a supramolecular filler,
  dispersing the supramolecular filler in a thermosetting rubber, the thermosetting rubber including unsaturated active sites capable of crosslinking to form a thermoset rubber; thereafter
  crosslinking the thermosetting rubber to form a thermoset rubber with the supramolecule building blocks forming a plurality of sheet-like structures through hydrogen bonding, the sheet-like structures interacting through non-covalent interactions to form crystallized domains within the thermoset rubber, wherein the supramolecular filler covalently links the supramolecular building block to the thermosetting rubber during one of said step of dispersing or said step of crosslinking, and wherein the supramolecule building blocks are selected from peptides, β-peptides, aramid oligomers, and bis-ureas.

10. The process of claim 9, wherein the supramolecular filler has the following structure:

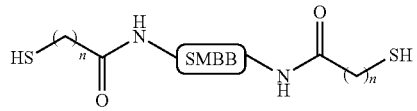

wherein SMBB represents a supramolecular building block and n is 2 or greater.

11. The process of claim 9, wherein the supramolecular filler has the following structure:

13. A process of forming a reinforced thermoset rubber comprising the steps of:
  covalently linking supramolecule building blocks to a thermosetting rubber, the thermosetting rubber including unsaturated active sites capable of crosslinking to form a thermoset rubber; thereafter
  mixing the thermosetting rubber to disperse the supramolecular building blocks therein; thereafter
  crosslinking the thermosetting rubber to form a thermoset rubber with the supramolecule building blocks forming a plurality of sheet-like structures through hydrogen bonding, the sheet-like structures interacting through non-covalent interactions to form crystallized domains within the thermoset rubber, wherein the supramolecule building blocks are selected from peptides, β-peptides, aramid oligomers, and bis-ureas.

14. The process of claim 13, wherein the supramolecule building blocks are β-alanines according to the following structure:

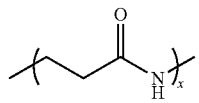

wherein x is from 1 to 8.

15. The process of claim 13, wherein the supramolecule building blocks are aramids according to one of the following structures:

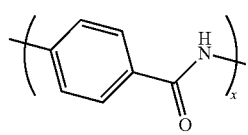

wherein x is from 1 to 8.

16. The process of claim 13, wherein the supramolecule building blocks are aramids according to one of the following:
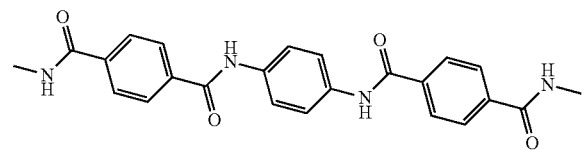
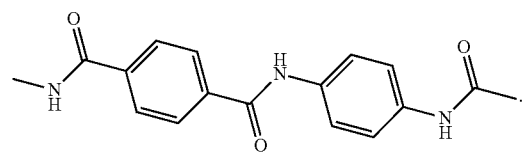
17. The process of claim 13, wherein the supramolecule building blocks are aramids according to one of the following:
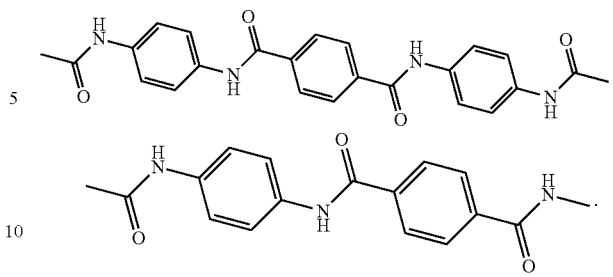
18. The process of claim 13, wherein the supramolecule building blocks are aramids according to one of the following structure:
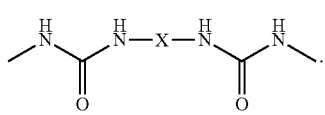
* * * * *